(12) United States Patent
Cutler

(10) Patent No.: US 6,343,897 B1
(45) Date of Patent: Feb. 5, 2002

(54) APPARATUS AND METHOD FOR SPREADING PARTICULATE MATERIALS

(75) Inventor: William Cutler, Plantation, FL (US)

(73) Assignee: Culter-Malone Industries, Inc., Sunrise, FL (US)

( * ) Notice: Subject to any disclaimer, the term of this patent is extended or adjusted under 35 U.S.C. 154(b) by 0 days.

(21) Appl. No.: 09/422,216

(22) Filed: Oct. 19, 1999

(51) Int. Cl.[7] .............................................. B65G 53/10
(52) U.S. Cl. ........................ 406/143; 406/42; 406/43; 406/109; 406/145; 406/194; 406/197
(58) Field of Search ........................... 406/42, 43, 108, 406/109, 122, 143, 145, 146, 157, 164, 194, 196; B65G 53/12

(56) References Cited

U.S. PATENT DOCUMENTS

| | | | |
|---|---|---|---|
| 831,635 A | * 9/1906 | Strunce | 406/143 |
| 1,500,966 A | * 7/1924 | Supinger | 406/42 |
| 1,943,376 A | * 1/1934 | Dilling | 302/42 |
| 2,570,004 A | * 2/1951 | Penny | 91/44 |
| 3,007,744 A | * 11/1961 | Ward et al. | 302/53 |
| 3,405,514 A | 10/1968 | Pulrang | |
| 3,567,120 A | 3/1971 | Suda | |
| 3,746,217 A | * 7/1973 | Hanset et al. | 222/194 |
| 3,899,131 A | * 8/1975 | Mester et al. | 239/123 |
| 4,186,885 A | 2/1980 | Christian | |
| 4,215,824 A | 8/1980 | Weiste | |
| 4,538,941 A | * 9/1985 | Thorne | 406/143 |
| 4,709,860 A | 12/1987 | Patrick et al. | |
| 4,793,742 A | 12/1988 | Strand | |
| 4,815,414 A | 3/1989 | Duffy et al. | |
| 4,852,809 A | 8/1989 | Davis et al. | |
| 5,018,910 A | * 5/1991 | Weiss | 406/144 |
| 5,558,474 A | * 9/1996 | Wildon | 406/127 |
| 5,590,984 A | * 1/1997 | Assarsson | 406/32 |

\* cited by examiner

*Primary Examiner*—Donald P. Walsh
*Assistant Examiner*—Joe Dillon, Jr.
(74) *Attorney, Agent, or Firm*—Foley & Lardner

(57) ABSTRACT

A system for applying particulate materials comprising a supply source of pressurized gas, a chamber with first and second opposed side walls, at least one pressurized gas entrance conduit for transporting pressurized gas to the chamber, at least one material hopper for depositing particulate material into the chamber, and at least one pressurized gas exit conduit for transporting particulate material away from the chamber. The wand is flexible and is manually controlled so that the user can control the exact direction in which the particulate material is to be focused. The wand includes a switch which sends a signal to a signal-actuated valve which is coupled to the entrance conduit. Upon receiving the appropriate signal, the signal-actuated valve adjusts so as to alter the flow of particulate material. The apparatus is powered by a motor source which maintains an optimum pressure range inside the entrance conduit through the use of a feedback loop operating between the motor source, the compressor, a pressure valve and a throttle. The apparatus is of the appropriate size so as to be mounted on a vehicle.

30 Claims, 6 Drawing Sheets

APPARATUS AND METHOD FOR SPREADING PARTICULATE MATERIALS

TECHNICAL FIELD

This invention relates generally to systems for spreading particulate materials. More particularly, this invention relates to a system for spreading particular amounts of particulate materials in an even manner across different surfaces.

BACKGROUND OF THE INVENTION

There are several devices currently known to the landscaping industry which perform an effective job of distributing particulate materials across open spaces such as grass fields. One such device comprises a hopper with a rotary vane attached underneath that can spread particulate materials in all directions as the hopper is pushed forward or backward. Although such devices are adequate for wide-open spaces, they have several shortcomings in other situations. For example, there is often a need to spread fertilizer, pesticides, or other materials along the underside of shrubbery or garden plants. Because concentrated fertilizer can be corrosive and can damage plant tissue because of chemical burning, there is a need for a way to uniformly apply fertilizer below the leaves of the plants while avoiding placing any fertilizer on top of the leaves. Because common hopper-type spreaders cannot perform this task adequately, landscape maintenance workers often have to perform this task by hand by dipping a cup or other container into a hopper or bag and then distribute the material by hand to the underside of the shrubbery. This process can be very cumbersome and time-consuming, and it is very difficult to guarantee that the particulate materials are evenly distributed over the intended surfaces. When a worker uses this process, some areas will often get no particulate material at all, while other areas will get too much material. Additionally, if the worker is not careful or is in a hurry, fertilizer could accidentally be thrown onto the leaves of the plant, causing serious damage to the plant. Finally, distributing the fertilizer by hand can cause the worker to accidentally spill material upon himself, which can create an unprofessional image of the worker or pose health risks depending upon the composition of the fertilizer.

Similar problems exist for other particulate materials. For example, it is often desirable to evenly distribute grass seed in corners or hard-to-reach areas of a plot of land. Additionally, it can also be important to distribute salt or urea on icy and snowy pavement or sidewalk during the winter months. Although there are several products currently on the market that perform an adequate job of distributing these materials along sidewalks or roads, these devices often have a difficult time reaching non-flat, paved areas such as steps or corners. If the salt or urea is not adequately distributed on such surfaces, portions of the surfaces can remain icy and slippery and could result in serious harm to someone who walks on the surfaces. As in the case of the landscape maintenance worker, people often spread the materials by hand to reach difficult places. But this can be very time-consuming and it is difficult to ensure that the material is evenly spread across the surfaces.

There are still other areas where there is a need for evenly spreading particulate materials while maintaining precise control of where the materials are deposited. For example, golf course maintenance personnel often need to spread dry sand in sand traps and other areas. In these situations, a user's options are often quite limited in how they can efficiently and adequately spread the materials in an even manner.

It is also important that a person who is spreading particulate materials can do so over a large area quickly and efficiently. In the case of a large plot of land, a worker must often spread particulate materials in many different locations in hard to reach areas.

There have been attempts to develop systems for spreading particulate materials in an even manner, but each has its drawbacks. In particular, several devices use a combination of a rotary vane and a blower motor to power the spreader through a large boom. Blower motors are an inefficient means of forcing air at a velocity sufficient to force the particulate materials out of the boom, however, and such systems would require air hoses with a diameter of about two to four inches. These devices can also be so large and heavy that they must be mounted in the bed of a compact pick-up truck in order to be transported. Furthermore, the exit channels on many of these devices are fixed in position relative to the rest of the device and have a limited range direction when spreading the materials.

SUMMARY OF THE INVENTION

It is therefore an object of this invention to provide an improved system for spreading particulate materials across surfaces in an evenly-distributed manner.

It is another object of this invention to provide an improved system for spreading particulate materials in which the user can precisely control the direction in which the materials are spread.

It is another object of this invention to provide a system for spreading particulate materials that can be adapted to spread materials of different densities.

It is yet another object of this invention to provide a vehicle-mounted system for spreading particulate materials.

It is yet another object of this invention to provide an system for spreading particulate materials that can spread the materials in more than one direction at one time.

It is yet another object of this invention to provide a system for applying particulate materials wherein the user has the ability to quickly activate or discontinue the flow of the particulate material.

It is yet another object of this invention to provide a system for spreading particulate materials wherein the amount of material that is distributed can be quickly adjusted.

It is yet another object of this invention to provide a system for spreading particulate materials wherein the system can make adjustments to ensure that a constant amount of material is being distributed over time.

It is still another object of this invention to provide a system for spreading particulate materials wherein the apparatus can be easily operated.

To obtain the above-described objects, one aspect of this invention provides for a particulate spreader comprising an engine which supplies energy to a compressor. The compressor compresses air or other compressible fluid in a pressurized supply source, and the pressurized gas flows from the supply source into a chamber or metering block through a pressurized gas entrance conduit. At the same time, particulate material from a material hopper is deposited into the metering block. The particulate material is carried or entrained by the pressurized gas into an exit conduit, preferably in the form of a flexible hose with a wand at the end thereof. Both the air flow and the flow of particulate material can be modified by manually adjusting a series of valves. The preferred engine-compressor combination includes a feedback loop for maintaining the air pressure within a certain range. A user holds the exit conduit at a handle and points the wand in the appropriate direction and activates a switch in the handle for starting the flow of gaseous material to the metering block, spreading the particulate material in the desired location. The user also operates the switch when it is desired to stop the spreading operation by discontinuing the flow of air into the metering block. The switch and valve can also be modified to maintain a partial flow of air into the metering block.

According to another aspect of the invention, one engine and one compressor are used to supply compressed air to two separate metering blocks. Each metering block has an exit conduit connected to it so that particulate materials can be spread in multiple directions at one time.

These and other objects, advantages, and features of the invention, together with the organization and manner of operation thereof, will become apparent from the following detailed description when taken in conjunction with the accompanying drawings, wherein like elements have like characters throughout the drawings described below.

DETAILED DESCRIPTION OF THE INVENTION

Figure 1:
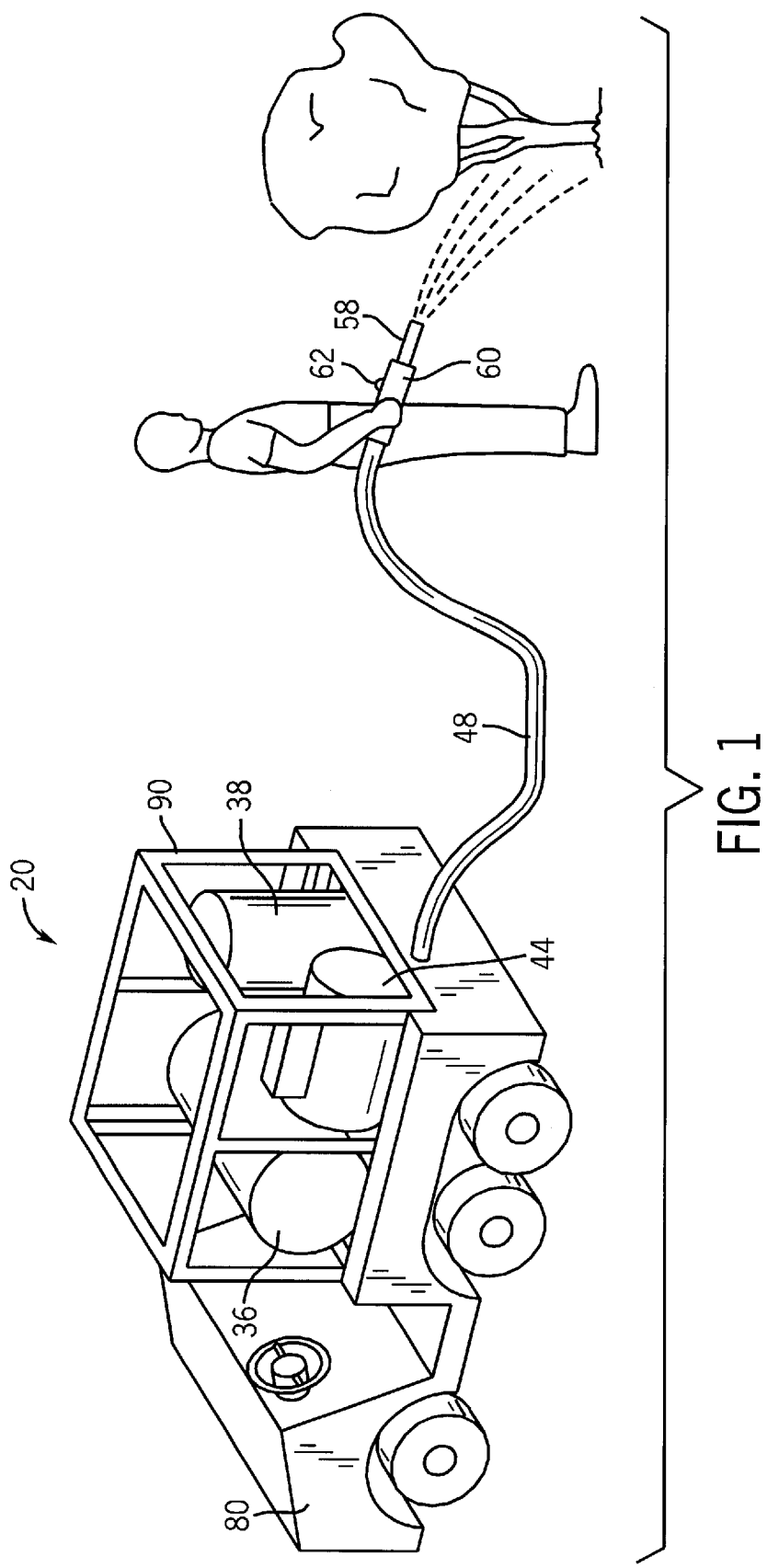
FIG. 1 is an isometric view of apparatus for spreading particulate materials.
Figure 2:
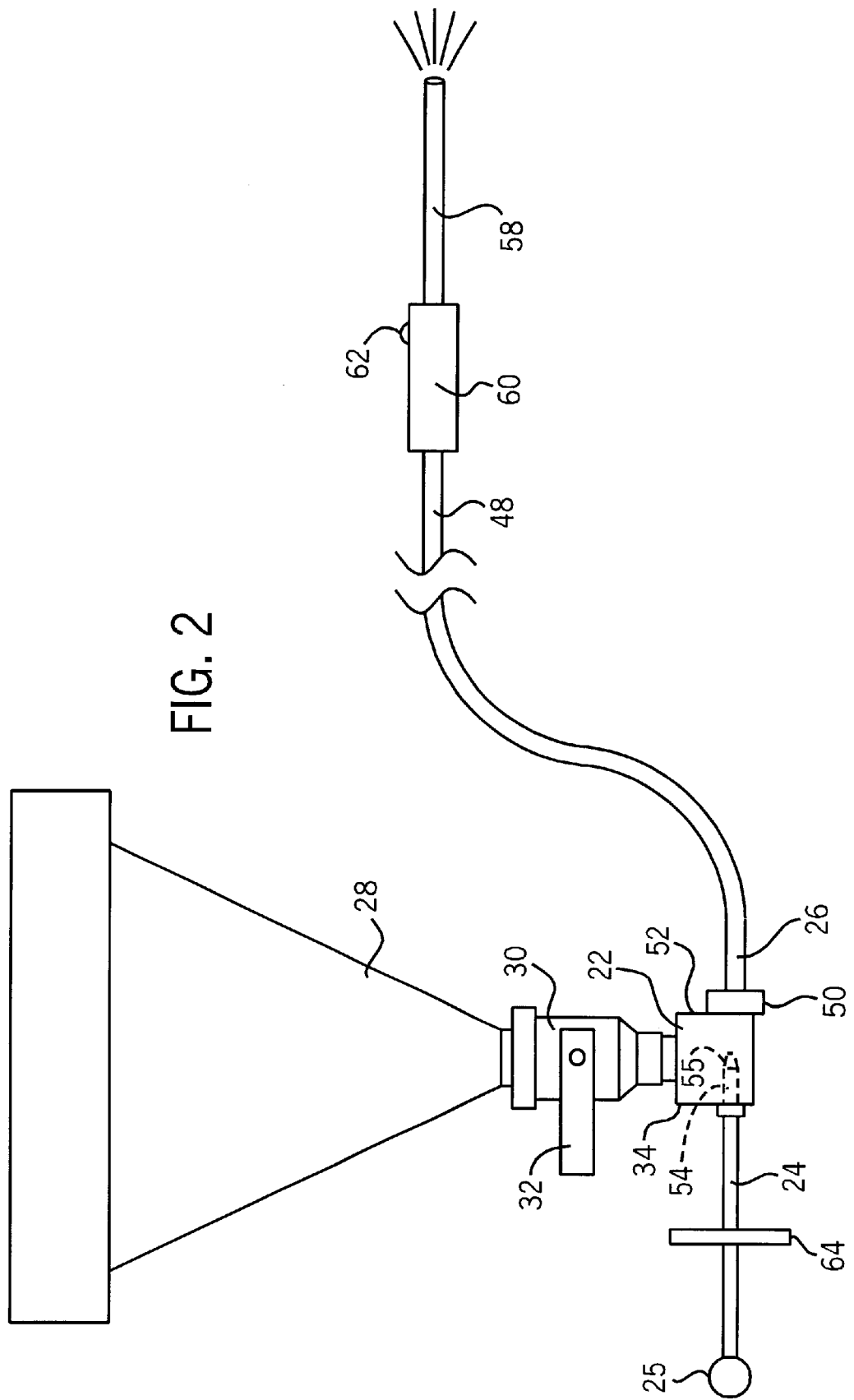
FIG. 2 is a side view of the apparatus shown in FIG. 1, more particularly showing the components that make up the mixing and distribution of the particulate materials.

As can be seen in FIGS. 1 and 2, a particulate spreader indicated generally at 20 comprises a chamber or metering block 22 with a pressurized gas entrance conduit 24 and an exit conduit 26 connected thereto. A material hopper 28 is located generally above the metering block 22 and includes a passage 30 that runs from the bottom of the material hopper 28 to the top of the metering block 22. Preferably, the passage 30 is gravity-fed with particulate material from the material hopper 28. In one embodiment of the invention, the channel 30 includes a valve 32 for adjusting the amount of particulate or particulate material that enters the metering block 22. In a most preferred embodiment of the invention, the valve 32 on the channel 30 is a standard ball valve.

Figure 3:
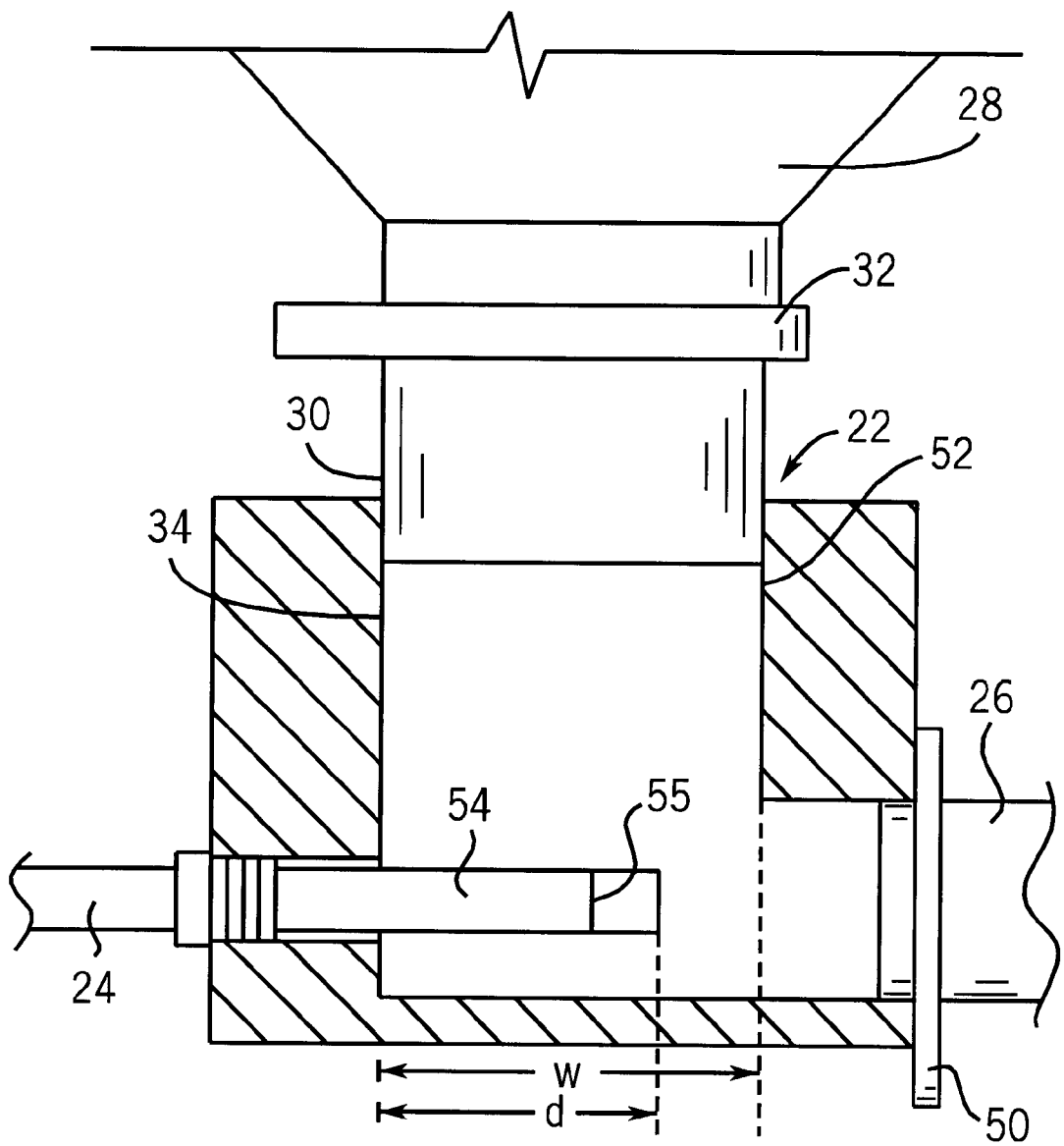
FIG. 3 is a side view of the metering block in conformance with one embodiment of the invention.
Figure 4:
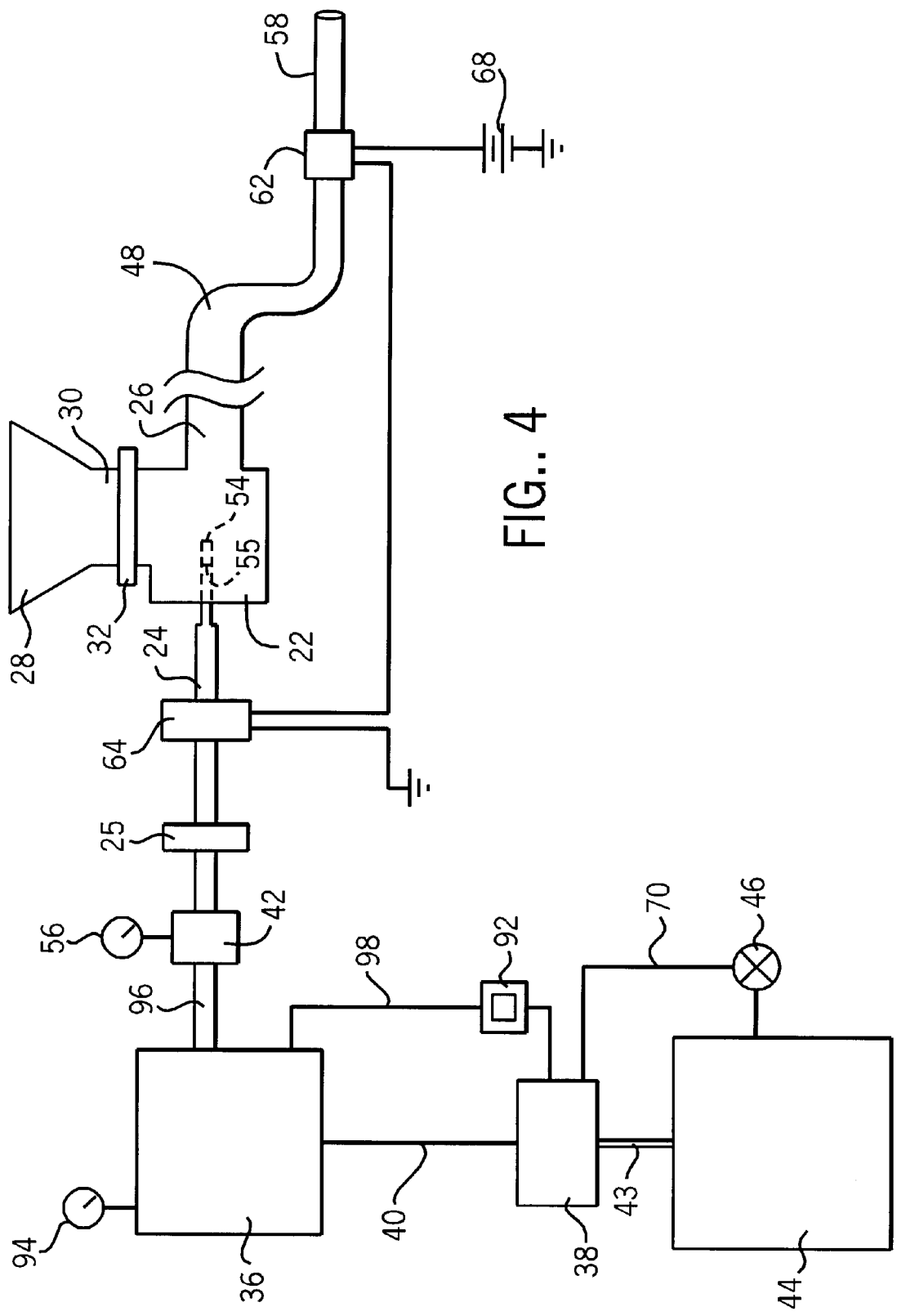
FIG. 4 is a pneumatic and electrical system diagram of the flow of the pressurized gas from the air tank to the metering block and the electrical circuit for actuating the system by using the handle-mounted switch.

Referring to FIG. 3, the air entrance conduit 24 includes an air nozzle 54 which protrudes through a first wall 34 of the metering block 22 by a predetermined distance d. In a preferred embodiment of the invention, the nozzle 54 has an exit diameter 55 of about one-eighth of an inch. As shown in FIG. 4, the pressurized gas entrance conduit 24 runs from the metering block 22 back to an air tank 36. In the illustrated embodiment of the invention, the pressurized gas entrance conduit 24 is in the form of an air hose and has a diameter of about three-eighths of an inch. The air inside the air tank 36 and the pressurized gas entrance conduit 24 is compressed by a compressor 38 which is connected to the air tank 36 by an air supply line 40. Also connecting the compressor 38 to the air tank 36 is a second pressure line 98. Communicating with the air tank 36 on the entrance conduit 24 is a regulator 42, which is connected to the air tank 36 via an intermediary conduit 96. Communicating between the compressor 38 and the air tank 36 is an unloader 92. A pressure gauge 94 is also attached to the air tank 36 so that a user can visually monitor the air pressure inside the air tank 36. The unloader 92 is preset for a standard operating range. The compressor 38 is connected by a transmission link 43 to a prime mover such as a motor or a preferably gasoline-driven internal combustion engine 44. The engine 44 can be the same as the engine used by a vehicle upon which the spreader 20 is mounted (FIG. 1), or the engine 44 can be dedicated to supply power to the spreader 20 alone. A throttle 46 is coupled to the engine 44. The compressor 38 and the engine 44 are connected to each other by a first pressure line 70 and by the transmission link 43 which is used by the engine 44 to supply power to the compressor 38. The power transmission link drive train 43 can take the form of a drive shaft, belt, a hydraulic line, gearing, or a more complicated transmission.

Referring to FIGS. 2 and 3, the exit conduit 26 is in the form of a flexible hose 48. The hose 48 is connected to the metering block 22 by a hose disconnect 50 at a second wall 52 of the chamber. The hose 48 can be any of several lengths and preferably has a diameter of about one inch. The length of hose 48 is selected to be long enough for a user on foot to use it comfortably, supposing that the spreader 20 is mounted on a vehicle, but not so long that significant reductions of pressure and velocity result. The user can also employ the flexible hose while riding in or driving the vehicle. A wand 58 terminates the hose 48, and can be pointed in virtually any direction by the user in order to precisely direct the flow of particulate materials to the areas where they are wanted. A handle 60 is mounted on the hose 48 near its end and includes an electrical switch 62 for adjusting the air flow in the spreader 20.

As seen in FIG. 4, the switch 62 is electrically connected to an electrically-actuated valve 64 which is coupled to the entrance conduit 24. The switch 62 is capable of being placed in at least two positions. In the illustrated embodiment of the invention, the electrically-actuated valve 64 is in the form of a solenoid valve which can either completely open or close the entrance conduit 24, either permitting or restricting the movement of air to the metering block 22. In an alternative embodiment of the invention, the electrically-actuated valve can have three or more positions such that when the position of the switch 62 is adjusted, a signal is sent to the electrically-actuated valve 64, which in turn adjusts its position to either permit more or less air to pass through the entrance conduit 24. The switch 62 selectively connects the electrically-actuated valve 64 to a battery 68. In a preferred embodiment of the invention, the battery 68 is capable of producing a current of about three amperes at twelve volts DC.

The air flow to the metering block 22 can also be manually controlled by adjusting a ball valve 25 (FIGS. 2 and 4) located along the pressurized gas entrance conduit 24. In one embodiment of the invention, the ball valve 25 acts as an emergency shut-off for the spreader 20.

The operation of the spreader is as follows. The engine 44 is used to power the compressor 38. The compressor 38 works to compress the air inside the air tank 36. In order to adequately operate the electrically-actuated valve 64 (when, as preferred, it is a solenoid valve), the compressor 38 should compress the air in the air entrance conduit 24 to about fifty pounds per square inch. In a preferred embodiment of the invention, the pressure in the air entrance conduit 24 is regulated to be in the range of sixty to ninety pounds per square inch.

In order to maintain the appropriate pressure in the air entrance conduit 24 at this range, the pressure generated in the air tank should remain in the range of about 100 to 115 pounds per square inch. To maintain the pressure in this range, the pressure gauge 56 and the unloader 92 monitor the air pressure. When the pressure exceeds about 115 pounds per square inch in the pressure gauge 56, the unloader 92 closes the first pressure line 70 running between the compressor 38 and the engine 44. The closure of the first pressure line 70 results in a closing of the throttle 46. The closing of the throttle 46 powers down the engine 44, preventing the compressor 38 from forcing additional air into the air tank 36. Similarly, when the pressure in the air tank falls below about 100 pounds per square inch, this will be sensed by the pressure gauge 56. The unloader 92 opens the first pressure line 70 running between the compressor 38 and the engine 44. This also opens the throttle 46 (FIG. 2), which powers up the engine 44. Additional power is then applied to the compressor 38 in order to increase the pressure in the air tank 36.

Referring in particular to FIGS. 2 and 3, when the air inside the air tank 36 is under the appropriate pressure and the ball valve 25 is at least partially open, compressed air is forced into the metering block 22. By opening the valve 32 between the material hopper 28 and the metering block 22, particulate material is permitted to fall into the metering block 22. In preferred embodiment of this invention, the particulate material can be salt, sand, fertilizer, pesticide, herbicide, urea, or grass or other seed, although other materials are possible so long as the materials are not so thick or sticky as to clog up the inside of the channel 30 or the metering block 22. One advantage of the invention is that the air pressure and particulate feed flow can be adjusted for different particulate or particulate materials. The density and therefore the fluid-entrainment characteristics will vary greatly among these various kinds of solid particulates; less air mass is needed to push grass seed than, for example, quartzite sand. As the particulate material falls into the metering block 22, it carried by the air stream flowing out of the nozzle 54 into the exit conduit 26.

In order to ensure to that substantially all of the particulate material is transported into the exit conduit 26, the location of the end of the nozzle 54 relative to the second wall 52 is important. Preferably, the open end of the nozzle 54 should be positioned at a distance d which is between one-half and three-fourths of the width w, taken between the first wall 34 and the second wall 52. In a most preferred embodiment of the invention, the end of the nozzle 54 is positioned about five-eighths of the way across the metering block 22 to the second wall 52. In one preferred embodiment of the invention, the distance from the first wall 34 to the second wall 52 is about 2.2 inches. The end of the nozzle 54 is substantially coaxial with the exit conduit 26.

As the particulate or granular materials interact with the air stream coming from the nozzle 54, they are transported through the hose 48 to the wand 58. The user holds the wand 58 by the handle 60 and points the wand 58 in the desired direction. When the switch 62 is in a position in which at least some air is flowing through the entrance conduit 24, the particulate materials will be forced out of the wand 58 and the particulate materials will be spread in the desired direction. In a preferred embodiment of the invention where fertilizer is used as the particulate material, between about six and a half and seventeen pounds of material should be spread per minute, although this amount can be easily adjusted by adjusting the regulator 42, the valve 32 below the material hopper, or adjusting the switch 62 on the handle 60 if the switch 62 has more than two positions. The exact flow rate of particulate materials can also vary depending on the diameter of the entrance and exit conduits 24 and 26, the size and geometry of the metering chamber 22, and the density of the material being spread.

Figure 5:
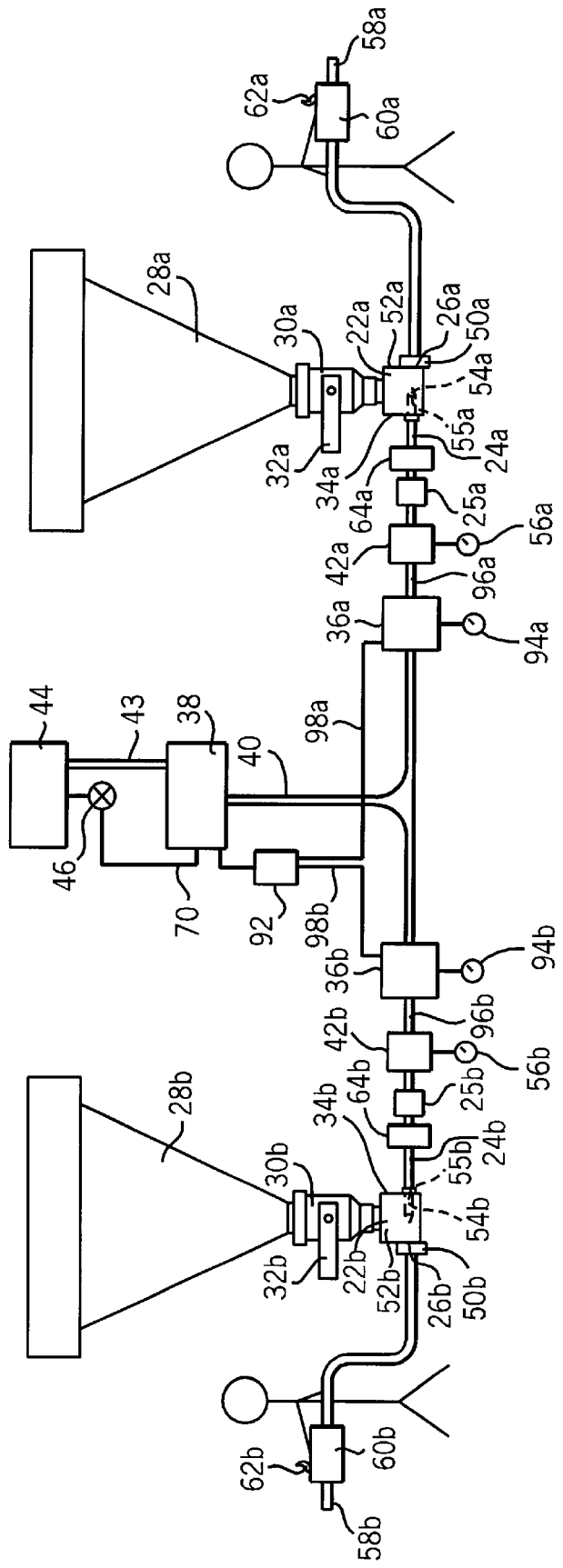
FIG. 5 is a side view of a system for spreading particulate materials wherein material can be spread in multiple directions.

In another embodiment of the invention, the spreader 20 can be altered so that more than one person can use it at one time. As shown in FIG. 5, the compressor 38 can be used to supply compressed gas to two metering blocks 22a,b. In one embodiment of the invention, each air line 40 is connected to its own air tank 36, although it is also possible to have one air tank 36 supply air for two air entrance conduits 24. Where there two air tanks 36a and 36b, a pressurized gas entrance conduit 24a,b connects each air tank 36a,b to separate metering blocks 22a,b, with material hoppers 28a,b located above respective metering blocks 22a,b. Each metering block 22a,b has an exit conduit 26a,b leading away from it towards a respective wand 58a,b. In this manner, two users may use separate wands 58a,b so as to be able to spread the material in different directions. Because the compressor 38 must require additional energy to compress air for both entrance conduits 24a and 24b, the unloader 92 would have to be maintained at a higher pressure. In a preferred embodiment of the invention, the pressurized gas would need to be maintained at between about 160 and 190 pounds per square inch.

Figure 6:
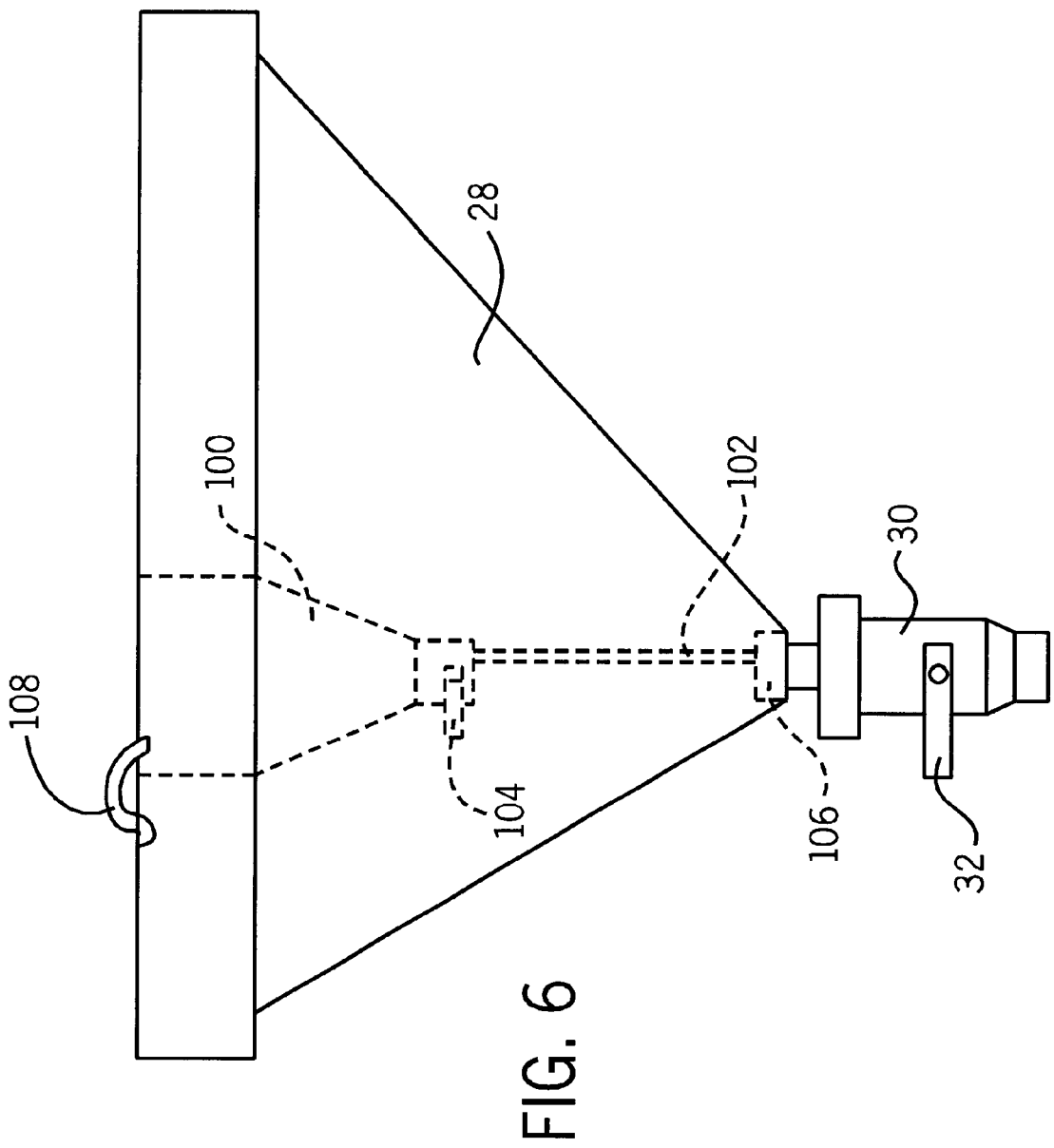
FIG. 6 is a side view of an alternative embodiment of the invention wherein two concentrically-positioned material hoppers are used to spread different types of materials, a second and internally-disposed one of the hoppers being shown in phantom.

In a second alternative embodiment of the invention as shown in FIG. 6, a second material hopper 100 can be placed inside the primary material hopper 28. The second material hopper 28 is connected to the primary hopper 28 by a hook 108 or other mechanical means that are well-known to those skilled in the art such as bolts or latches. The second hopper 100 is coupled to a flexible line 102 which runs to the bottom of the primary hopper 28. An additional ball valve 104 is coupled to the line 102 for adjusting the flow of material from the second hopper 100. Attached to the base of the primary hopper 28 and the line 102 is a fitting 106 which allows material from both hoppers 28 and 100 to enter the passage 30 leading to the metering block 22. Due to the smaller dimensions of the second hopper 100 and the line 102, it is preferable that very light materials such as seed or insecticide be used in the second hopper 100, although other materials may be possible.

In yet another embodiment of the invention as shown in FIG. 1, the spreader 20 includes all of its essential components arranged inside a frame 90 that is of proper size so as to be able to be placed in the back of a vehicle 80 such as a low-bed pickup. Several such "Truckster" vehicles, such as a John Deere Gator, a Toro Utility Vehicle, a Cushman Utility Vehicle, a Kawasaki Mule, or a Haulmaster are all capable of having the frame 90 of the particulate spreader stored thereon. By having the hose 48 be of a sufficient length, the user is capable of directing the wand 58 to spread particulate material while still keeping the vehicle 80 in motion. Additionally, it is also possible to have the particulate spreader 20 mounted on a trailer to be towed by a motorized vehicle. The user(s) may apply particulate material while seated in or even while driving the vehicle, or the user may stand near the vehicle while spraying the material.

While several preferred embodiments have been shown and described, it is understood that changes and modifications can be made to the invention without departing from the invention's broader aspects. For example, instead of using two material hoppers for an apparatus that comprises two hoses for spreading the particulate materials, the apparatus could use one large hopper which is connected to both metering blocks. Also, the metering block can have the shape of a cylinder, wherein the first and second walls mentioned in the specification would each represent a portion of the inner cylindrical wall of the block. Additionally, it is possible to use fluids other than pressurized air to transport the particulate materials through the exit conduit. Instead of relying on a dedicated engine, the prime mover of the pump could be a vehicle engine with power obtained from a belt, shaft, or hydraulic line, and a different power/pressurized air regulation scheme. Finally, it is feasible that frozen materials such as very fine-grained snow or ice could be spread using this apparatus. Thus, it is apparent that alternative embodiments are available to those skilled in the relevant art. Therefore, the present invention is not limited to the described and illustrated embodiments but only by the scope and spirit of the appended claims.

I claim:

1. A device for spreading particulate materials, comprising:

a source of pressurized gas;

a chamber having first and second substantially oppositely positioned ends, the chamber coupled to the source of pressurized gas;

at least one material hopper coupled to the chamber, the at least one hopper having at least one opening releasing particulate materials into the chamber via gravity; and a flexible exit conduit coupled to the chamber, the flexible exit conduit accepting pressurized gas and particulate materials from the chamber, wherein the pressurized gas from the source of pressurized gas enters the chamber at a point below said at least one hopper opening such that the distance between the first end of the chamber and entrance point of the pressurized gas into the chamber is between about one-half and about three-quarters of the distance from the first end to the second end of the chamber, such that when particulate material is deposited into the chamber, the particulate material is entrained through the exit conduit by the pressurized gas.

2. Apparatus for applying particulate materials, comprising:

a supply source of pressurized gas;

a chamber with first and second opposed side walls;

a pressurized gas entrance conduit for transporting pressurized gas and having a first end and a second end, the first end connected to the supply source of pressurized gas, the second end protruding through the first side wall of the chamber to be located within the chamber;

at least one material hopper having at least one opening communicating with the chamber said second end below said at least one hopper opening for introducing by gravity particulate material into the chamber; and an exit conduit for transporting particulate materials and pressurized gas away from the chamber, the exit conduit having a first end opening onto the second side wall for having particulate materials exit therethrough, wherein the distance between the first side wall and the second end of the entrance conduit is between about one-half and about three-quarters of the distance from the first side wall to the second side wall of the chamber, such that when particulate material is deposited into the chamber, the particulate material is entrained through the exit conduit by a stream of pressurized gas.

3. The apparatus of claim 1, wherein the distance between the second end of the entrance conduit and the first end of the exit conduit is about five-eighths of the distance from the first side wall to the second side wall of the chamber.

4. The apparatus of claim 1, further comprising a regulator located along the pressurized gas entrance conduit for maintaining the flow of pressurized gas from the supply source to the chamber.

5. The apparatus of claim 1, further comprising a regulator located along the pressurized gas entrance conduit for manually adjusting the flow of pressurized gas from the supply source to the chamber.

6. The apparatus of claim 1, wherein the distance from the first wall to the second wall of the chamber is about 2.2 inches.

7. The apparatus of claim 1, wherein the apparatus is capable of distributing particulate materials selected from the group consisting of salt, fertilizer, urea, herbicide, pesticide, plant seed, and sand.

8. The apparatus of claim 1, wherein the particulate material exits the exit conduit at a rate of at least about six pounds of particulate material per minute.

9. The apparatus of claim 1, wherein the exit conduit is in the form of a flexible hose.

10. The apparatus of claim 9, further comprising a handle coupled to the hose for a user to hold the hose.

11. The apparatus of claim 1, further comprising:

a second chamber with first and second opposed side walls;

a second material hopper, the material hopper having at least one opening located generally above the second chamber for having particulate material transported therethrough a second pressurized gas entrance conduit for transporting pressurized gas having a first end and a second end, the first end connected to the supply source of pressurized gas, the second end protruding through the first side wall of the second chamber to be located within the chamber;

a second exit conduit connected to the second chamber for having pressurized gas and particulate materials exit therethrough, wherein the distance between the second entrance conduit exit point and the second exit conduit entrance point is at least about one-half but no more than about three-quarters of the distance from the first side wall to the second side wall of the second chamber.

12. The apparatus of claim 11, wherein the distance between the second entrance conduit exit point and the second exit conduit entrance point is about five-eighths of the distance from the first side wall to the second side wall of the second chamber.

13. The apparatus of claim 1, wherein the exit conduit is cylindrically shaped and has a diameter of about one inch.

14. The apparatus of claim 13, wherein the pressurized gas entrance conduit is cylindrically shaped, and wherein the diameter of the second end of the entrance conduit is about one-eighth of an inch.

15. The apparatus of claim 1, further comprising a compressor connected to the supply source, wherein the compressor causes the pressurized gas in the pressurized gas entrance conduit to be pressurized to at least 50 pounds per square inch.

16. The apparatus of claim 15, wherein the compressor maintains the pressurized gas located in the entrance conduit at between about 60 and 90 pounds per square inch.

17. The apparatus of claim 1, further comprising a conduit connecting the material hopper and the chamber.

18. The apparatus of claim 17, further comprising a valve located on the conduit between the material hopper and the chamber, wherein the valve is capable of being adjusted to alter the amount of particulate material that is transported from the material hopper to the chamber.

19. The apparatus of claim 17, further comprising:
   a second chamber with first and second opposed side walls;
   a second entrance conduit for transporting pressurized gas having a first end and a second end, the first end connected to the supply source of pressurized gas, the second end protruding through the first side wall of the second chamber, the second end located within the chamber; and
   a second exit conduit connected to the second chamber for having particulate materials exit therethrough,
   wherein the hopper includes a second opening located generally above the second chamber, and wherein the distance between the second pressurized gas conduit exit point and the second exit conduit entrance point is at least about one-half but no more than about three-quarters of the distance from the first side wall to the second side wall of the second chamber.

20. The apparatus of claim 1, wherein the apparatus is mounted on a vehicle.

21. The apparatus of claim 1, further comprising a second material hopper having at least one opening communicating with the chamber for introducing particulate material into the chamber.

22. The apparatus of claim 21, further comprising a channel coupled to the second material hopper for transporting particulate material from the second hopper to the chamber.

23. The apparatus of claim 22, further comprising a valve for adjusting the amount of material that is transported from the second hopper to the chamber.

24. A method for spreading particulate materials, comprising the steps of:
   supplying a source of pressurized gas;
   selectively passing the pressurized gas from the source into a chamber having first and second substantially oppositely positioned ends, wherein the pressurized gas enters the chamber at a point such that the distance between the first end of the chamber and entrance point of the pressurized gas into the chamber is between about one-half and about three-quarters of the distance from the first end to the second end of the chamber; thereby increasing the entrainment of the particulate material in the gas;
   releasing particulate material from at least one material hopper into the chamber via gravity and unto said entrance point such that the particulate material is entrained in the flow of pressurized gas;
   responsive to said steps of selectively passing and releasing, transmitting the particulate material and the pressurized gas into a flexible exit conduit exiting from the chamber; and
   manually pointing the exit conduit in the direction which the particulate material is to be spread.

25. The method according to claim 24, further comprising the step of adjusting the flow of particulate material from the material hopper into the chamber.

26. The method according to claim 24, further comprising the step of adjusting the flow of pressurized gas from the supply source to the chamber.

27. The method according to claim 24, further comprising the step of releasing particulate material from a second hopper into the chamber such that the particulate material is entrained in the flow of pressurized gas.

28. The method according to claim 24, further comprising the steps of:
   selectively passing the pressurized gas from the source into a second chamber;
   releasing particulate material from a second hopper into the second chamber such that the particulate material is entrained in the flow of pressurized gas;
   responsive to said steps of selectively passing and releasing, transmitting the particulate material and the pressurized gas from the second chamber into a second flexible exit conduit exiting from the second chamber; and
   manually pointing the second exit conduit in the direction which the particulate material is to be spread.

29. The method according to claim 24, further comprising the steps of:
   supplying a second source of pressurized gas;
   selectively passing the pressurized gas from the second source into a second chamber;
   releasing particulate material from a second hopper into the second chamber such that the particulate material is entrained in the flow of pressurized gas;
   responsive to said steps of selectively passing and releasing, transmitting the particulate material and the pressurized gas from the second chamber into a second flexible exit conduit exiting from the second chamber; and
   manually pointing the second exit conduit in the direction which the particulate material is to be spread.

30. The method according to claim 29, further comprising the step of adjusting the flow of particulate material from the second hopper to the second chamber.

* * * * *